Aug. 31, 1965     L. E. CORWIN     3,203,391
AIR NAVIGATION INSTRUMENT
Filed Sept. 9, 1963     2 Sheets-Sheet 1
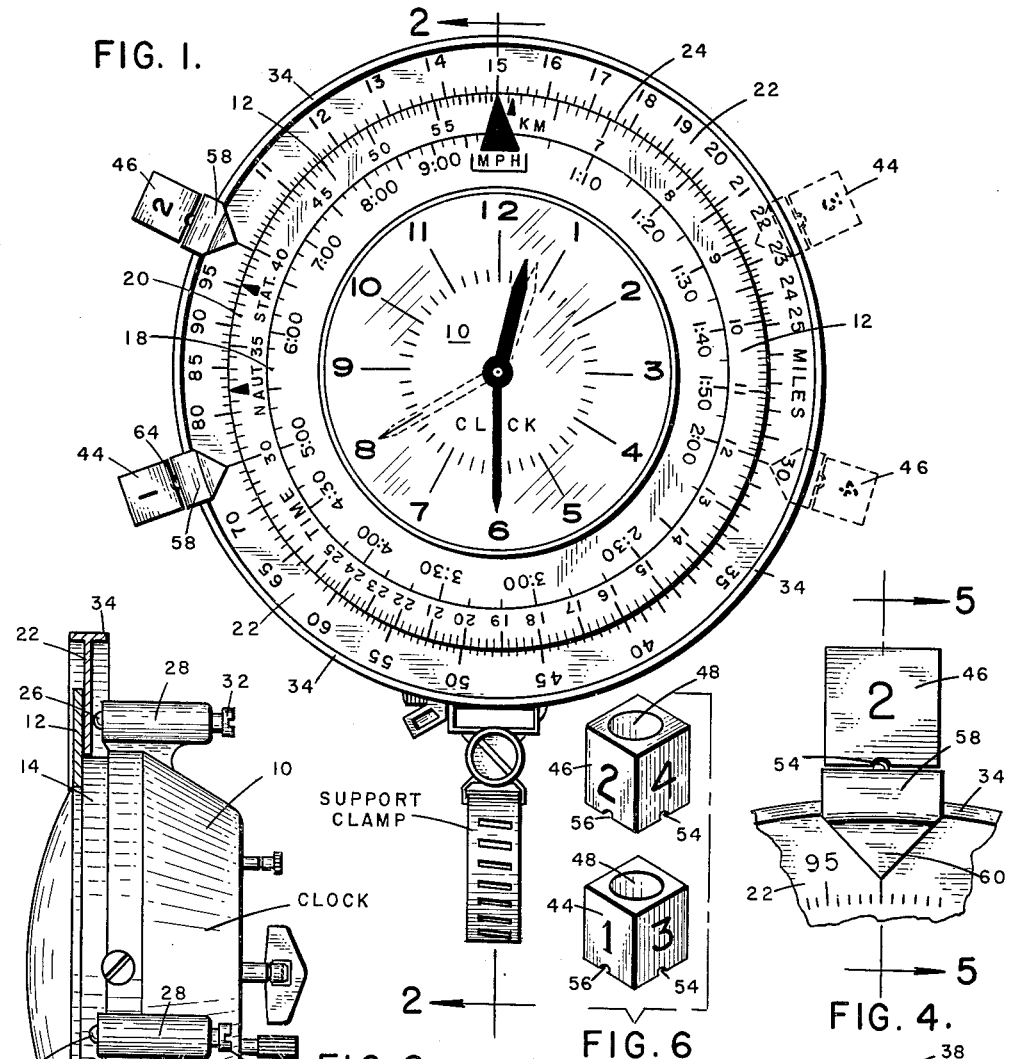
INVENTOR.
LLOYD E. CORWIN,
BY Frank S. Tried
ATTORNEY.

Aug. 31, 1965  L. E. CORWIN  3,203,391
AIR NAVIGATION INSTRUMENT

Filed Sept. 9, 1963  2 Sheets-Sheet 2

INVENTOR.
LLOYD E. CORWIN,
BY Frank S. Troidl
ATTORNEY.

United States Patent Office 3,203,391
Patented Aug. 31, 1965

3,203,391
AIR NAVIGATION INSTRUMENT
Lloyd E. Corwin, 312 North, Baytown, Tex.
Filed Sept. 9, 1963, Ser. No. 307,526
6 Claims. (Cl. 116—135)

This invention relates to navigational instruments. More particularly, this invention is an improved air navigational instrument.

The air navigational instrument to be described herein is particularly useful in small aircraft. This new air navigational instrument is relatively inexpensive and can be easily operated by owners and pilots of private aircraft with a minimum of instruction. The new air navigational instrument is compact and can be easily installed on the control panel of aircraft.

Briefly described, the invention comprises a circular time scale. A rotatable circular distance scale is mounted concentrically to the circular time scale. Indicating members are mounted for movement along the rotatable circular distance scale.

An important part of this invention is the use of the indicating members in combination with the time scale and distance scale. With the proper operation of the time scale, distance scale, and indicating members, the pilot will always know precisely his location along a predetermined flight path. In addition, the pilot will always know the distance flown from the home airport, the distance remaining to his destination, ground speed, the lapsed time since his departure from the home airport, the time he will arrive at his destination, and his precise position between two checkpoints.

The invention, as well as its many advanatages, will be further understood by reference to the following detailed description and drawings in which:

FIG. 1 is a plan view of the new air navigational instrument;

FIG. 2 is a side elevational view, partly in section, of the instrument;

FIG. 3 is an enlarged sectional view of a portion of the instrument;

FIG. 4 is an enlarged view of one of the indicating members;

FIG. 5 is a view taken along lines 5—5 of FIG. 4;

FIG. 6 is a perspective view illustrating the manner in which the indicating members identify checkpoints;

Figure 7:
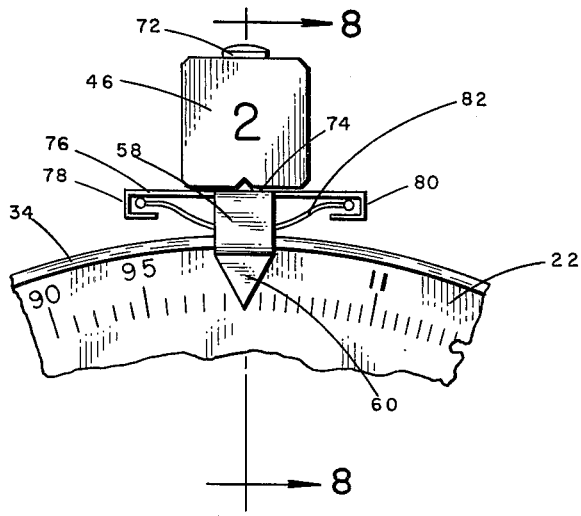
FIG. 7 is a view showing a second embodiment of indicating means.

Referring to the drawings and more particularly to FIG. 1 and FIG. 2, the air navigational instrument includes a clock 10. An annular member 12 is connected to the rim 14 of clock 10 by means of a plurality of screws such as screw 16 (see FIG. 3).

The annular member 12 is provided with a circular time scale consisting of an inner set of graduations 18 and an outer set of graduations 20. Graduations 18 indicate hours and divisions thereof; graduations 20 indicate minutes.

A second annular member 22 is included as a part of the air navigational instrument. Annular member 22 is mounted concentrically with the annular member 12. Graduations 24 are provided on annular member 22. Graduations 24 are arranged to indicate distance and are located adjacent to the outer graduations 20 on annular member 12.

The annular distance scale 22 can be rotated. The underside of distance scale 22 rides upon a plurality of plungers such as plunger 26 shown in FIG. 3. The plungers 26 extend from housings 28. Each plunger 26 is biased against the underside of distance scale 22 by a coil spring 30 mounted within the housing 28. The pressure exerted by coil spring 30 against plunger 26 may be adjusted by means of screw 32.

The distance scale 22 is provided with a rim 34. The indicating means are mounted for movement along the rim of the rotatable distance scale 22. As shown in FIGS. 4, 5, and 6, the indicating means include a hollow pin member such as hollow pin 36 provided with a cap 38.

While using an air navigational instrument in aircraft, particularly in small aircraft, it is highly important that the vibrations of the aircraft do not cause the indicating members to ride along the outer perimeter of the distance scale 22. To hold the indicating means firmly in place once positioned, a plunger 40 is biased against the rim 34 of distance scale 22 by a coil spring 42 mounted within the hollow pin 36.

As shown in FIG. 1, the indicating means includes a first checkpoint identifying member 44 and a second checkpoint identifying member 46. These checkpoint identifying members may be in the shape of a cube as illustrated. As shown in FIG. 5, each checkpoint identifying member is provided with a counterbore 48, thus providing a circular shoulder 50. A coil spring 52 is mounted in the counterbore 48 and presses against the shoulder 50 and the cap 38 of hollow pin 36.

Each checkpoint identifying member is provided with channels such as channels 54 and 56. The channels are on the underside of the checkpoint identifying member.

Each indicating means includes a pointer support 58 which rides on the rim 34 of distance scale 22 when the checkpoint identifying members are manually operated to move pointer 60. A plurality of protuberances 62 and 64 is provided on the outside surface of pointer support 58. Protuberances 62 and 64 are spaced by a 180° arc and are adapted to mate with grooves 54 and 56.

Figure 8:
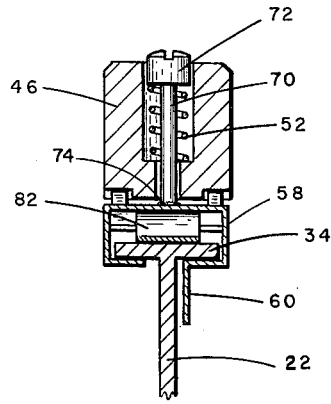
FIG. 8 is a sectional view taken along lines 8—8 of FIG. 7.

FIG. 7 and FIG. 8 show a second modification of indicating means. The parts shown in FIG. 7 and FIG. 8 which are identical to the parts shown in FIG. 4, FIG. 5, and FIG. 6 are identified by like numbers. Referring to FIG. 7 and FIG. 8, instead of a hollow pin a solid pin member 70 provided with a cap 72 is soldered to the outer edge 74 of pointer support 58. The length of pin 70 is such as to permit the checkpoint identifying member 46 to be moved outwardly against the bias of the coil spring 52.

A leaf spring support 76 is provided with portions 78 and 80. The leaf spring 82 is supported by the leaf spring support 76 with the extremities of the leaf spring 82 being mounted in the portions 78 and 80 of leaf spring support 76. The leaf spring provides frictional engagement against the outside of the distance scale 22, thus preventing unwanted movements of the checkpoint identifying members as a result of vibrations.

In operation, the pilot selects the appropriate Sectional or WAC charts and draws his true course on the charts. A number of suitable visible and identifiable checkpoints are then selected. The checkpoints are then written on a separate pad of paper in a manner as disclosed in Table I.

Table 1

| | |
|---|---|
| Home airport | 0 miles. |
| 75 miles | |
| Checkpoint 1 | 75 miles. |
| 25 miles | |
| Checkpoint 2 | 100 miles. |
| 125 miles | |
| Checkpoint 3 | 225 miles. |
| 75 miles | |
| Checkpoint 4 | 300 miles. |

You will notice from reading Table I that the distances between checkpoints are placed between the names in the left-hand list. The accumulated mileage from the home airport to the checkpoint in question is located to the right of the particular checkpoint.

Checkpoint identifying member 44 is provided with numbers 1–3–5–7. Checkpoint identifying member 46 is provided with numbers 2–4–6–8. Checkpoint identifying member 44 with the number 1 showing is set at the number of miles, 75, on distance scale 22. Checkpoint identifying member 46 with the number 2 showing is set at the number of miles, 100, on distance scale 22 from the home airport to checkpoint 2.

The pilot then takes off and crosses the home airport with the appropriate compass heading to follow the true course and sets the hands of clock 10 to twelve o'clock.

When checkpoint 1 is reached, the pilot observes the number of minutes of elapsed time on clock 10. The pilot then sets this number of minutes on the annular time scale opposite the number of miles from the home airport to checkpoint 1, 75 miles, on the distance scale 22. The exact speed of the aircraft is indicated by the triangular index 80 on time scale 12. The ground speed is read from the distance scale 22 opposite the index 80. The positions of checkpoint identifying member 44, checkpoint identifying member 46, time scale 12, distance scale 22, and the clock hands are then as shown in FIG. 1. Notice that it has taken 30 minutes to travel from the home airport to checkpoint 1, a distance of 75 miles. The ground speed is 150 m.p.h. as indicated on distance scale 22 opposite triangular index 80.

When the pilot reaches checkpoint 2, he once again observes the elapsed time on the clock 10 and, if necessary, adjusts the mileage on distance scale 22 to the appropriate minutes on the scale 12. This keeps the pilot informed of any ground speed changes which he reads opposite the index 80 and also keeps the time to the next checkpoint correct.

After checkpoint 2 is reached, the pilot pulls checkpoint identifying member 44 outwardly against the bias of spring 52 and rotates the checkpoint identifying member 44 until the number 3 shows. Checkpoint identifying member 44 is then advanced to the appropriate number of miles on distance scale 22 for checkpoint 3. As shown, this mileage is 225 miles. Checkpoint identifying member 46 is then rotated until the number 4 shows and is moved to the appropriate number of miles on distance scale 22 for checkpoint 4. As shown, this mileage is 300 miles. The positions of the identifying means and the clock hands are then as shown in broken lines in FIG. 1.

I claim:

1. An air navigational instrument comprising: a support; a fixed annular member having a circular time scale formed thereon connected to said support; a coaxial annular rotatable member supported by said support and having a circular distance scale formed thereon, said coaxial annular rotatable member having a greater radius than the fixed annular member, and the circular time scale and the circular distance scale being located on said fixed annular member and said coaxial annular rotatable member so as to be adjacent one another; a rim integral with the annular rotatable member; and at least one indicating means, each indicating means including a pointer support, a pointer on said pointer support, a pin member connected to the pointer support, a checkpoint identifying member rotatably mounted on said pin member, and frictional means in frictional contact with the outer edge of the rim of the annular rotatable member, each pointer support having turned in portions fitted over the rim of the annular rotatable member so as to permit movement of the indicating means along the rim of the annular rotatable member.

2. An air navigational instrument in accordance with claim 1 wherein the checkpoint identifying member rotatably mounted on said pin member has a counterbore formed therein to provide a shoulder in the checkpoint identifying member, the pin member is provided with a cap, and a coil spring is mounted in the counterbore so as to press against said shoulder and said cap.

3. An air navigational instrument in accordance with claim 1 wherein there are two independently movable indicating means.

4. An air navigational instrument in accordance with claim 3 wherein the checkpoint identifying members have outside perimeters including a plurality of flat surfaces, each flat surface having a checkpoint identifying number thereon.

5. An air navigational instrument in accordance with claim 4 wherein the frictional means includes a leaf spring support and a leaf spring mounted in the leaf spring support and in contact with the outer edge of the rim of the annular rotatable member.

6. An air navigational instrument in accordance with claim 4 wherein the pin member is hollow with a closed outer end and an open inner end; and the frictional means includes a spring mounted in the pin member and against the closed outer end of the pin member; and a plunger biased by said spring against the outer edge of the rim of the annular rotatable member.

References Cited by the Examiner

UNITED STATES PATENTS

| 234,863 | 11/80 | Farnsworth | 58—152 |
| 2,155,101 | 4/39 | Schnell | 116—124 |

FOREIGN PATENTS 206,899  11/56  Australia.

LOUIS J. CAPOZI, *Primary Examiner.*